Dec. 3, 1935.  F. SUSTERSIC  2,022,987
STEERING MEANS
Filed April 18, 1935
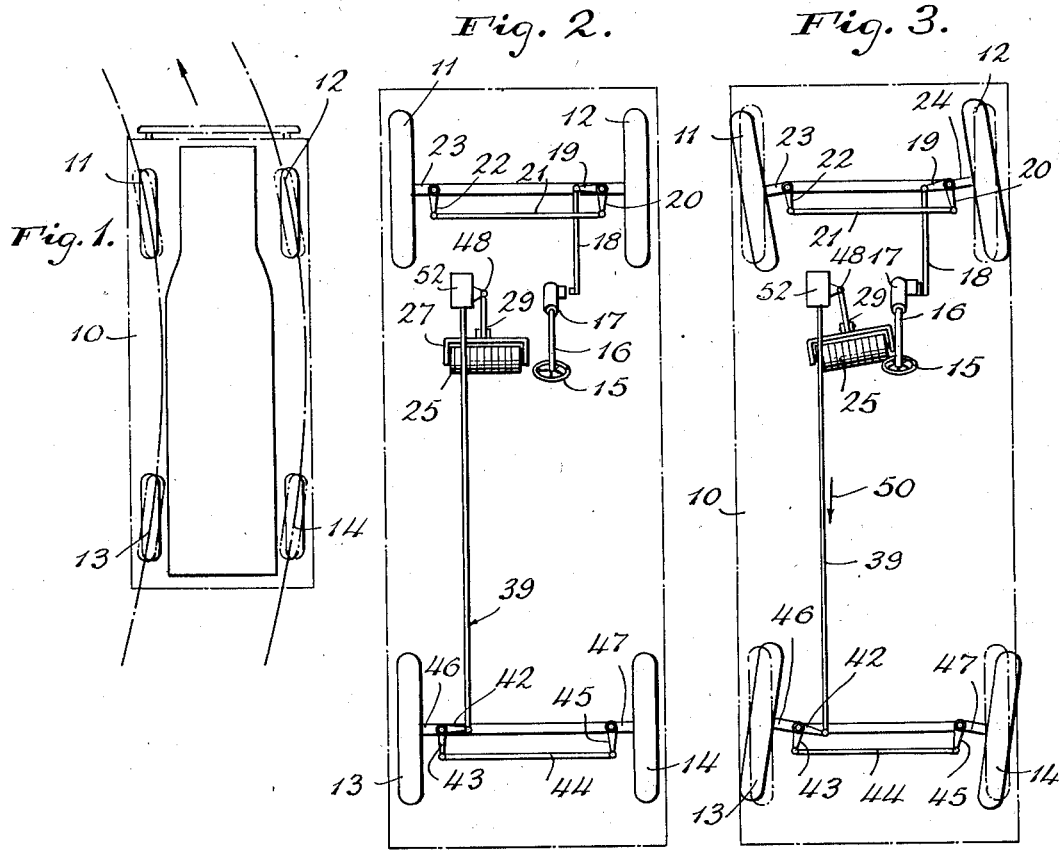
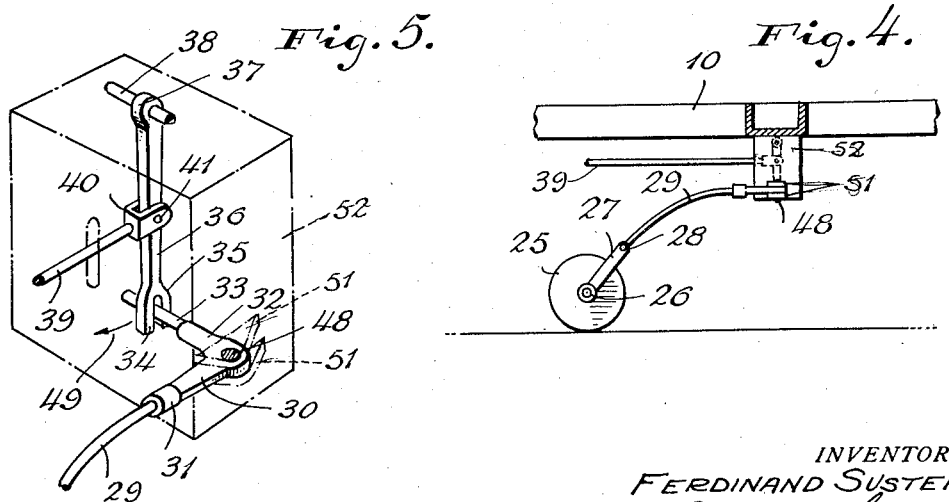
INVENTOR
FERDINAND SUSTERSIC
BY
Richards & Geier
ATTORNEYS Patented Dec. 3, 1935

2,022,987

UNITED STATES PATENT OFFICE 2,022,987

STEERING MEANS

Ferdinand Sustersic, Slezska Ostrava, Czechoslovakia

Application April 18, 1935, Serial No. 17,031
In Czechoslovakia June 2, 1933

4 Claims. (Cl. 280—91)

This invention relates to steering means and refers more particularly to means for steering the traction wheels of an automobile or other vehicle in conformity with the steering of the front wheels.

In automobiles now in use the steering is confined to the front wheels, so that a change in the direction of travel of the car is caused only by the movements of the front wheels thereof. When passing along a curve, the traction wheels do not follow the movement of the front or steering wheels but travel along an arc having a smaller diameter than that described by the front wheels. This limits the steering facilities of a motor car and makes it impossible to construct long and narrow cars, since the distance between the steering wheel axle and the traction wheel axle can not be increased above a certain predetermined length.

An object of the present invention is the provision of a simple and automatically operable steering device by means of which the traction wheels of a vehicle are caused to follow the front wheels in every position thereof.

The above and other objects of this invention may be realized through the provision of a steering device comprising a trailing roller or other suitable means swinging in conformity with the steering movements of the front wheels of a vehicle and means transforming this swinging motion into a reciprocatory movement of a steering rod used for steering the traction wheels of the vehicle. The invention will appear more clearly from the following detailed description when taken in connection with the accompanying drawing showing a preferred embodiment of the inventive idea.

In the drawing:

Figure 1 is a diagram showing the adjustment of the traction wheels in conformity with the position of the front wheels.

Figure 2 shows the steering device while the vehicle is moving along a straight line.

Figure 3 shows the same device while the vehicle is moving along a curve.

Figure 4 shows the trailing roller in side elevation and on a larger scale.

Figure 5 shows on a still larger scale the device connecting the trailing roller with the steering rod.

The vehicle shown in the drawing comprises a frame 10, a pair of front or steering wheels 11 and 12, and a pair of traction wheels 13 and 14. The front wheels 11 and 12 are steered by the usual steering wheel 15, mounted upon a steering rod 16 which is connected at its other end with the steering mechanism 17 transmitting by means of links 18, 19, 20, 21, and 22, the rotary movement of the steering wheel 15 to the axles 23 and 24 which carry the wheels 11 and 12, respectively.

The device for steering the rear wheels comprises a trailing roller 25 which is in contact with the ground and which is rotatably mounted upon a shaft 26 carried by a U-shaped frame 27. The frame 27 is connected by means of a pivot 28 with a rod 29.

As shown more clearly in Figure 5 of the drawing, one end of the rod 29 is firmly connected with an angle piece 30. The piece 30 comprises a sleeve 31 which surrounds one end of the rod 29 and is rigidly connected therewith, and also comprises another sleeve 32 which is situated at right angles to the sleeve 31. The sleeve 32 surrounds and is rigidly connected with a rod 33 extending between two ends 34 and 35 of a bifurcated lever 36. The opposite end 37 of the lever 36 has the shape of a sleeve and is rotatably mounted upon a shaft 38. The angle piece 30 is rotatably mounted upon a pivot 48 which is carried by the projections 51 of a casing 52 carried by the frame 10 (Fig. 4). A steering rod 39 is rigidly connected with a U-shaped piece 40 which embraces the lever 36 and is connected with this lever by means of a pivot 41.

As shown in Figures 2 and 3 of the drawing, the steering rod 39 is connected by means of links 42, 43, 44, and 45, with the axles 46 and 47 of the traction wheels 13 and 14, respectively.

The device operates as follows:

When the vehicle is running along a straight line the various elements of the device occupy the position shown in Figure 2 of the drawing. When the driver desires to turn the vehicle to the left (looking in the direction of Figures 1, 2, and 3) he turns the steering wheel 15 in the usual manner, thus causing a movement of the links 18, 19, 20, 21, and 22, with the result that the front wheels 11 and 12 will move from the position shown by broken lines in Figure 3 to the position by full lines in the same figure.

After the front wheels 11 and 12 have swung to the desired extent, the roller 25 which trails along the ground will also follow this turning movement and will swing to the right (looking in the direction of Figures 2 and 3), from the position shown in Figure 2 to the position shown in Figure 3.

Since the angle piece 30 is connected to the roller 25 by means of the rod 29, the piece 30 will swing around its pivot 48 so that the rod 33 will be moved in the direction of the arrow 49.

Since the rod 33 is situated between the ends 34 and 35 of the lever 36, this lever will swing around its shaft 38 and will consequently move the steering rod 39 in the direction of the arrow 50, shown in Figure 3. The rod 39 will move the links 42, 43, 44, and 45, thus swinging the axles 46 and 47 of the traction wheels 13 and 14.

Due to this arrangement the traction wheels 13 and 14 will follow exactly the same curve as the front wheels 11 and 12, as shown diagrammatically in Figure 1 of the drawing.

An important advantage of the described device is the possibility of increasing the distance between the wheel axles when constructing motor vehicles, since the direction of the front wheels will always correspond to the direction of the traction wheels.

Another advantage is the elimination of skidding since as soon as the rear portion of the vehicle begins to skid, the traction wheels will be set automatically by the roller 25 at such an angle, that any further skidding will be prevented.

Finally, due to the fact that the traction wheels follow the front wheels, the steering angle of the front wheels may be made smaller and thus the entire steering of the front wheels may be made more sensitive and accurate.

What is claimed is:

1. A steering device for the rear wheels of a vehicle, comprising means swinging in conformity with the steering movements of the front wheels of a vehicle, a steering rod, links connecting said steering rod with the axles of the rear wheels of the vehicle, and means connecting the first-mentioned means with said steering rod and transforming the swinging motion of the first-mentioned means into a reciprocatory motion of said steering rod.

2. A steering device for the rear wheels of a vehicle, comprising in combination with a vehicle frame, a trailing roller, means connecting said roller with said frame, said roller being adapted to swing in conformity with the steering movements of the front wheels of the vehicle, a steering rod, links connecting said steering rod with the rear wheels of the vehicle, and means connected with said steering rod and the first-mentioned means for transforming the swinging movement of said roller into a reciprocatory motion of said steering rod.

3. A steering device for the rear wheels of a vehicle, comprising a trailing roller, a frame rotatably supporting said trailing roller, a rod connected with said frame, said roller, frame and rod being adapted to swing in conformity with the steering movements of the front wheels of a vehicle, a rod movable along with the first-mentioned rod, a lever in contact with the second-mentioned rod and oscillatable by the movements of the latter, a steering rod connected with said lever and movable thereby, and a plurality of links connecting said steering rod with the rear wheels of a vehicle.

4. A steering device for the rear wheels of a vehicle, comprising a trailing roller, a shaft carrying said roller, a frame connected with said shaft, a rod connected with said frame, an angle piece connected with said rod, a pivot, said angle piece being mounted upon said pivot, another rod connected with said angle piece, a lever having one end adapted to come in contact with the second-mentioned rod, the second-mentioned rod being adapted to swing said lever, a steering rod, means connecting said steering rod with said lever, and links connecting said steering rod with the rear wheels of a vehicle.

FERDINAND SUSTERSIC.